United States Patent Office 3,634,351
Patented Jan. 11, 1972

3,634,351
ORGANIC SOLVENT OR WATER SOLUBLE
VINYL-GRAFT RESIN
Morio Kimura, Tadashi Watanabe, Koichiro Murata, and Naozumi Iwasawa, Hiratsuka-shi, Japan, assignors to Kansai Paint Company, Limited, Kanzaki-Amagasaki-shi, Hyogo-ken, Japan
No Drawing. Filed June 5, 1969, Ser. No. 830,843
Claims priority, application Japan, June 7, 1968, 43/38,640
Int. Cl. C08f 1/00, 21/00; C09d 3/68
U.S. Cl. 260—22 CB
10 Claims

ABSTRACT OF THE DISCLOSURE

A process for preparing graft-resin for paint, more particularly the process for preparing new graft-resin obtained by grafting vinyl monomers onto alkyd resins containing at least one of cis-4-cyclohexene-1,2-dicarboxylic acid, endo-bicyclo-(2,2,1)-5-heptene - 2,3 - dicarboxylic acid, their anhydrides, and halides as components.

The present invention relates to the process for preparing graft-resin for paint, more particularly to the process for preparing new graft-resin obtained by grafting vinyl monomers onto alkyd resins containing at least one of cis-4-cyclohexene-1,2-dicarboxylic acid, endo-bicyclo-(2,2,1)-5-heptene-2,3-dicarboxylic acid, their anhydrides, and halides as components.

The structures of component materials of alkyd resins above mentioned are as follows: namely,
Cis-4-cyclohexene-1,2-dicarboxylic acid (a),

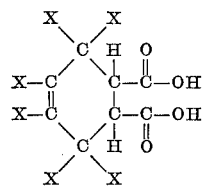

(a)

anhydride (b) of (a),

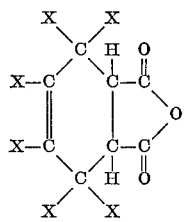

(b)

Or halides (c) of (a) and (b)
[hereinafter these compounds (a), (b) and (c) are all referred to as compound (I)].
And endo-bicyclo-(2,2,1)-5-heptene - 2,3 - dicarboxylic acid (d),

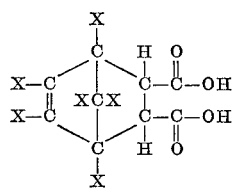

(d)

anhydride (e) of (d)

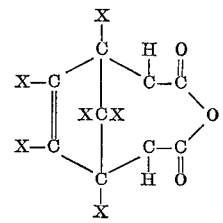

(e)

Or halides (f) of (d) and (e)
[hereinafter these compounds (d), (e) and (f) are all referred to, as compound (II)].

The compound (a) above mentioned is generally called tetrahydrophthalic acid, and this acid and its anhydride (b) are generally well known.

Moreover, as compound (c), 4-chloro-4-cyclohexene-1,2-dicarboxylic anhydride (U.S. Pat. No. 2,550,744); as compound (e), endo-bicyclo-(2,2,1)-5-heptene-2,3-dicarboxylic anhydride; as compound (f), 1,4,5,6,7,7 - hexachlorobicyclo-(2,2,1)-5-heptene - 2,3 - dicarboxylic anhydride, and 1,4,5,6,7,7-hexachlorobicyclo-(2,2,1) - 5 - heptene-2,3-dicarboxylic acid are also well known.

It has been known that the drying property of alkyd resins and the hardness, water resisting property, and chemical resistance of their films are improved by the modification with vinyl monomers.

As a process of modification being now employed, the alkyd resin has been synthesized, which contains an unsaturated fatty acid with a conjugated double bond, maleic anhydride or fumaric acid as a component, and then styrene, vinyl toluene, methacrylic esters and others have been grafted onto it. In the former method using an unsaturated fatty acid with conjugated double bond, the grafting efficiency is low and, contrary to the purpose, the homopolymer of vinyl compounds tends to be formed. In this case, homopolymer and alkyd components are mixed and non-homogeneous resin solutions are obtained owing to their incompatibility. The film obtained from these resin solutions becomes cloudy and hardly becomes flat. Alkyd resin modified with non-drying oil alone and oil-free alkyd resin without fatty acid show excellent film properties such as gloss retention and weathering resistance, but the hardness of the film, flexibility, adhesion, chemical resistance, staining resistance, solvent resistance, and water resisting property are poor. It is necessary to carry out graft polymerization to improve these properties. However, it was not possible to graft onto the existing resins. In the latter method using maleic anhydride (or fumaric acid) for preparing alkyd resin, if the reaction is carried out at higher temperature over 200° C., side reactions such as addition reaction with oil and that with OH group occur and sometimes results in gelation, because of the active double bond in maleic anhydride. The reaction is usually carried out at about 180° C. Therefore, resin with higher degree of condensation is not obtained and the molecular weight of resin obtained is low, so the properties of graft-resin obtained from this resin is restricted. Polymerization reaction does not occur between maleate or fumarate and vinyl monomers except a few types of monomer such as styrene, thus styrene must be added to the system in graft-polymerizing other vinyl monomers except styrene onto alkyd resin, and vinyl monomer being used to graft polymerization is also restricted.

On the other hand, according to the method of this invention, the hardness, flexibility, adhesion, chemical resistance, stain resistance, solvent resistance, and water resisting property of alkyd resin are greatly improved by using compound I and/or compound II above mentioned, and by grafting vinyl monomers onto it these properties may be further improved and very superior film can be obtained.

Because no gelation occurs in the formation of alkyd resin containing compound I and/or compound II, the reaction is carried out at higher temperature over 230° C., and resin with higher degree of condensation and higher molecular weight is obtained and the properties of the film can be further improved. The components corresponding to said compound I and compound II can be caused to react with many kinds of vinyl monomers, further hydrogen atom and halogen atom of the components are substracted by the reaction with other free radicals, wherein the resulted free radicals thus formed initiate polymerization reaction, so any kind of vinyl monomer can be employed in the graft polymerization, further the reaction can be carried out in high efficiency. Accordingly, film is obtained with expected properties, and this method is, superior to the usual method, very characteristic both in the properties of film and the resin formation. Furthermore, this method is applicable to the improvement of very wide types of resins from very long-oil alkyd resin to oil-free alkyd resin which does not contain oil fatty acid, thus it is very useful from the industrial point of view. Water-soluble resin can be easily obtained by grafting acid-type monomer such as acrylic acid or methacrylic acid onto alkyd resin prepared using compound I and/or compound II as a component. In the production of this water-soluble graft-resin, the amount of monomer with carboxyl group must be controlled for the acid value of graft-resin to be 40–150.

To make a detailed explanation of the preparative method of graft-resin according to the present invention, the reaction is carried out in this method.

Using alkyd resin containing at least one of compound I and compound II as components, without addition of solvent or with addition of suitable solvent, by dropping vinyl monomer or blending vinyl monomer with alkyd resin from the start, the reaction is carried out. This reaction is usually carried out in the presence of radical initiator. The reaction temperature is generally from 80° C. to 140° C. When vinyl monomer is added dropwise in the former method, a mixture of vinyl monomer and radical initiator is usually added dropwise to the alkyd resin in a reaction vessel over a period of 30 minutes to 3 hours. In the latter method where vinyl monomer is mixed with alkyd resin at the beginning to be reacted, a radical initiator dissolved in a suitable solvent is usually added dropwise to the mixed system put in a reaction vessel over a period of 30 minutes to 3 hours. The suitable amount of radical initiator is 0.5–4.0 parts (by weight) against 100 parts of vinyl monomer. The compounded amount of vinyl monomer and alkyd resin is varied arbitrary depending on the purpose. In order to improve alkyd resin by the grafting of vinyl monomer, compounding of 50–10 parts of vinyl monomer is preferable against 50–90 parts of alkyd resin by weight. On the contrary, in order to improve polymerizing resin by the introduction of alkyd resin into polymerizing resin such as acrylic resin, compounding of 50–10 parts of alkyd resin is preferable again 50–90 parts of vinyl monomer. One or more than two types of vinyl monomer can be used together.

Vinyl monomers used in the present invention are, for example, styrene, vinyl toluene, methyl acrylate, ethyl acrylate, butyl acrylate, 2-ethylhexyl acrylate, methyl methacrylate, ethyl methacrylate, butyl methacrylate, lauryl methacrylate, 2-hydroxyethyl methacrylate, 2-hydroxypropyl methacrylate, acrylic acid, methacrylic acid, acrylonitrile, acrylamide, vinyl acetate.

Alkyd resins used in the present invention are, as mentioned above, very long-oil alkyd resin, long-oil alkyd resin, medium-oil alkyd resin, short-oil alkyd resin, and oil-free alkyd resin which does not contain oil fatty acid, containing at least one of compound I and compound II as components. Namely, the oil length of these alkyd resin is 0 weight percent and 21–65 weight percent and covers the whole oil length of the known alkyd resins.

The graft polymerization described in the present invention is thought to be induced: by (1) the addition reaction resulting from the reaction between two double bonds, that is to say, between an alicyclic double bond in compound I and compound II contained as a component in alkyd resin, and a double bond in a vinyl monomer, and (2) as the hydrogen atom and halogen atom are subtracted from the α-carbon to the double bond of compound I or perhaps, the carbon of endomethylene in compound II contained as a component in alkyd resin by the attack of other free radicals (initiator free radical, monomer free radical, growing polymer radical etc.), or cleaved by heat or light, by the initiation of vinyl polymerization at that position or the termination reaction by the coupling of a growing polymer radical at that position. In this case, vinyl monomers with strong electron-attractive group such as acrylic acid and methacrylic acid is though to add mainly by the reaction (1), and those with electron-donating group such as styrene and vinyl toluene is thought to add mainly by the reaction (2). In the case of esters of acrylic acid and methacrylic acid such as ethyl acrylate and methyl acrylate the reactions (1) and (2) occur at the same time.

If these reactions are considered, the amount of alicyclic compounds, i.e. compound I and/or compound II as components, for the production of alkyd resin is desirable to be kept at 5–60 weight percent.

By the above procedure the present invention is found to be completed, and the method to obtain the resin with remarkable properties is invented.

In order to illustrate further the nature of the present invention, the representative procedures are described, but the invention is not restricted to these examples. The parts of raw materials used in the examples are by weight, if it is not specially indicated.

(I) EXAMPLES OF PREPARING ALKYD RESIN

Example 1

1068 parts of isophthalic acid, 534 parts of tetrahydrophthalic anhydride, 255 parts of adipic acid, 909 parts of neopentyl glycol and 591 parts of trimethylolpropane were added to a reaction vessel fitted with a thermometer, an agitator, a water-separator, and a gas inlet tube. The temperature of contents in a reaction vessel was raised gradually until the contents began to melt. The temperature was, then, raised to 160° C. with stirring and flowing nitrogen gas, and when the condensed water began to flow, the temperature was raised gradually to 230° C. and kept at that temperature. During the process the reaction was followed by measuring the acid value of contents. The reaction is stopped at the acid value of 9. From this reaction procedure oil-free alkyd resin was obtained with the following properties.

Acid value of resin—8.9
Viscosity of resin—(60% resin in n-butoxyethanol, measured with a Gardner-type bubble viscometer) Y (about 17.6 stokes)

This resin was diluted to 50% resin content with 2378 parts of xylene and 594 parts of n-butoxy ethanol.

Example 2

1070 parts of endo-bicyclo-(2,2,1)-5-heptene-2,3-dicarboxylic anhydride, 478 parts of phthalic anhydride, 960 parts of neopentyl glycol, and 240 parts of trimethylolpropane were added to the same type of reaction vessel used in Example 1 and the reaction was carried out in the same manner as in Example 1. The reaction was continued until the acid value of contents became 10. From this reaction procedure oil-free alkyd resin was obtained with the following properties.

Acid value of resin—9.8
Viscosity of resin—(60% resin in n-butoxyethanol, measured with a Gardner-type bubble viscometer) X–Y (about 12.9–17.6 stokes)

This resin was diluted to 66.7% resin with 1224 parts of xylene.

Example 3

169 parts of 4-chloro-4-cyclohexene-1,2-dicarboxylic anhydride, 66 parts of adipic acid, 274 parts of isophthalic acid, 231 parts of neopentyl glycol, 151 parts of trimethylolpropane, and 220 parts of coconut-oil fatty acid were added to the same type of reaction vessel used in Example 1. The temperature of reaction mixture was raised to 180° C. with flowing nitrogen gas. Then the reaction was continued for an hour at 180° C. Then the temperature was raised to 220° C. and the reaction was further continued until the acid value of contents became 8.5.

From this reaction procedure oil-modified alkyd resin was obtained with the following properties.

Acid value of resin—8.5
Viscosity of resin—(60% resin in n-butoxyethanol, measured with a Gardner-type bubble viscometer at 25° C.) W (10.70 stokes)
Oil length—22%

This resin was diluted to 60% resin content with 667 parts of n-butoxyethanol.

Example 4

1665 parts of 1,4,5,6,7,7-hexacolorobicyclo-(2,2,1)-5-heptene-2,3-dicarboxylic acid, 612 parts of trimethylolpropane, 630 parts of soybean-oil fatty acid, and 146 parts of xylene were added to the same type of reaction vessel used in Example 1. The temperature of reaction mixture was raised gradually to 180° C. with flowing nitrogen gas, and the reaction was continued for an hour at 180° C. The temperature was, then, raised to 210° C. and the reaction was further continued until the acid value of contents became 10. From this reaction procedure oil-modified alkyd resin was obtained with the following properties.

Acid value of resin—10
Viscosity of resin—(60% resin in xylene, measured with a Gardner-type bubble viscometer) W–Y (about 10.70–17.6 stokes)
Oil length—30%

This resin was diluted to 62.5% resin content with 1516 parts of n-butoxyethanol.

Example 5

66 parts of phthalic anhydride, 170 parts of tetrahydrophthalic anhydride, 92 parts of endo-bicyclo-(2,2,1)-5-heptene-2,3-dicarboxylic anhydride, 193 parts of trimethylolethane, 94 parts of pentaerythritol, 452 parts of linseed-oil fatty acid, and 50 parts of xylene were added to the same type of the reaction vessel used in Example 1. The temperature of contents was raised gradually to 180° C. with flowing nitrogen gas and the reaction was continued for an hour at 180° C. Then the temperature was raised to 220° C., and the reaction was further continued until the acid value of contents became 10. From this reaction procedure oil-modified alkyd resin was obtained with the following properties.

Acid value of resin—10.0
Viscosity of resin—(60% resin in xylene, measured with a Gardner-type bubble viscometer at 25° C.) P (4.0 stokes)
Oil length—45%

This resin was diluted to 60% resin content with 617 parts of xylene.

Example 6

49 parts of phthalic anhydride, 190 parts of tetrahydrophthalic anhydride, 140 parts of pentaerythritol, 82 parts of trimethylolethane; 606 parts of linseed-oil fatty acid, and 50 parts of xylene were added ot the same type of the reaction vessel used in Example 1. The temperature of contents was raised gradually to 180° C. with flowing nitrogen gas and the reaction was continued for an hour at 180° C. Then the temperature was raised to 230° C., and the reaction was continued until the acid value of contents became 5. From this reaction procedure oil-modified alkyd resin was obtained with the following properties.

Acid value of resin—5.0
Viscosity of resin—(60% resin content in xylene, measured with a Gardner-type Viscometer at 25° C.) E (1.25 stokes)
Oil length—60%

This resin was diluted to 50% resin with 950 parts of xylene.

(II) EXAMPLES OF PREPARING GRAFT-RESIN FROM ALKYD RESIN AND VINYL MONOMER

Example 7

500 parts of alkyd resin solution obtained in Example 1, 160 parts of xylene, and 40 parts of n-butoxyethanol were added to a reaction vessel fitted with a thermometer, an agitator, a dropping funnel, a reflux condenser, and a gas inlet tube. The temperature of contents was raised gradually to 115° C. with vigorous stirring and flowing nitrogen gas. When the temperature of contents reached 115° C., a mixture containing 115 parts of styrene, 100 parts of butyl acrylate, 30 parts of 2-hydroxyethyl methacrylate, 5 parts of acrylic acid, and 7.5 parts of benzoyl peroxide was added dropwise through a dropping funnel over a period of 2 hours. An hour after the addition of the mixture of vinyl monomers, one half of the mixture of 40 parts of xylene, 10 parts of n-butoxyethanol, and 2 parts of benzoyl peroxide put in a dropping funnel beforehand, was added at 115° C. over a period of 15 minutes, and after an hour, another half was added over a period of 15 minutes. Then the stirring was continued for 3 hours until the reaction was finished.

As the result of this reaction procedure graft-resin solution of 50% resin content, acid value of resin of 14.2 and viscosity of G (about 1.65 stokes) measured with a Gardner-type bubble viscometer, was obtained.

The graft-resin prepared by this reaction procedure was slightly yellow, and clear, and very excellent resin in which alkyd resin components and vinyl resin components were homogeneously compatible. However, the mixture of resin obtained in Example 1 with polymer from vinyl component alone in this example became cloudy and completely incompatible resin.

If this difference is considered, it is definitely observed that how effectively graft polymerization according to the method in the present invention is conducted. The graft-resin obtained in this example shows good compatibility with other resins. The resin mixture of 70 parts of graft-resin and 30 parts of amino resin by resin content was cured as a coating at 140° C. for 30 minutes and its properties were investigated. The hardness, flexibility, adhesion, solvent resistance, chemical resistance, and weathering resistance were excellent. In Table I is shown the results of tests on coating properties on the white enamels prepared from resin mixture varnishes, in which isobutanol-modified melamine resin was compounded to resin varnishes obtained in Examples 1 and 7 and reference resin varnishes, respectively, (compounding ratio: 70 parts; 30 parts (isobutanol-modified melamine resin as resin content), and titanium oxide (compounding ratio: 1:1 against resin content). Steel plates and glass plates were used for tests. Coated plates for tests were prepared according to JIS K 5400. The scratched value of coating with a pencil was measured according to JIS K 5622; salt-water spray test according to JIS Z 2371; gloss of coating surface, alkali resistance, boiling-water resistance, and outdoor weathering resistance according to JIS K 5400; solvent resistance was investigated by immersing in xylene at 20° C. according to JIS K 5400 (7.7): The reference tests were carried out under the same condition at the same time. The testing methods in Tables 3 and 4 described later are identical with the above methods.

(9) Salt water spray test (soft steel plate) (according to ASTM B–117)

In a chamber for salt water spray test in which 5% NaCl solution was being sprayed at 40° C., a specimen drawn a cross cut (X) on its coated surface reaching to the substrate and having a length of 10 cm., was set inclined by 80°. After 150 hours the specimen was taken out, and its surface was wiped. Then adhesive tape was stuck on the intersection of the cross cut, pressed uniformly force and torn off rapidly. The torn width of the coating was measured.

Example 8

To the same type of reaction vessel used in Example

TABLE 1.—COMPARISON OF COATING PROPERTIES
Film-drying: Baked at 140° C. for 30 min., thickness of dried film: $30 \pm 5\mu$

| | Sample | | |
|---|---|---|---|
| Item | White enamel using Example 1 and melamine resin varnish | White enamel using Example 7 and melamine resin varnish | Reference, white enamel using styrene-modified alkyd resin and melamine resin varnish [1] |
| Scratched value of film with a pencil | 3H | 3H | 3H. |
| Outdoor weathering resistance: | | | |
| Initial gloss value (60°) | 97 | 98 | 85. |
| Gloss value after outdoor exposure of 6 months (60°) | 81 | 92 | 60. |
| Solvent resistance (dipped in xylene at 20° C.) | Softened after 15 min | No change after 3 days | Swelled after 3 hrs. |
| Alkali resistance (dipped in 5% NaOH solution at 20° C.) | Deteriorated after 3 days | No change after 7 days | Swelled after 3 days. |
| Acid resistance (dipped in 5% acetic acid solution at 20° C.) | do | do | Do. |
| Boiling-water resistance (2 hrs.) | Bubbles formed, became a little cloudy. | No change | Became cloudy. |
| Salt-water spray test (5% NaCl solution, 150 hrs.) | 4 mm | 1 mm | 4 mm. |

[1] Styrene-modified alkyd resin is a reaction product with styrene (alkyd resin/styrene ratio=60/40) of soy bean fatty acid-modified alkyd resin (oil length 40%) from maleic anhydride (mole ratio: 0.5) and trimethylolpropane (mole ratio: 0.5).

TESTING METHODS (1) Preparation of coated plates for tests

After the surface of a soft steel plate (0.3 x 70 x 150 mm.) was polished with sand paper #320, it was washed with a mixed solvent of toluene/isopropanol=70/30 (weight ratio) to be degreased. Glass plate: a glass plate of 1.5 x 50 x 150 mm. was used.

(2) Scratched value with a pencil (soft steel plate)

After a specimen was left for 24 hours in a thermo-hydrostated chamber maintained at a temperature of $20 \pm 1°$ C. and a relative humidity of $75 \pm 3\%$, it was set horizontally in the chamber and strongly scratched with a sharpened pencil. The value was expressed by the hardness of the hardest pencil which could not make a scratch on the coated surface.

(3) Gloss value (soft steel plate) according to (ASTM D–333)

It was the measured value of reflectance percent of a mirror surface at an angle of 60°.

(4) Outdoor weathering resistance (soft steel plate)

A speciment was exposed outdoors. Coated surface was inclined 60° from the horizontal and facing south.

(5) Solvent resistance (soft steel plate)
A specimen was immersed in xylene at 20° C.

(6) Alkali resistance (glass plate)

A specimen was immersed in 5% aq. solution of sodium hydroxide at 20° C.

(7) Acid resistance (glass plate)

A test plate was immersed in 5% aq. solution of acetic acid at 20° C.

(8) Boiling water resistance (soft steel plate)

After specimen was immersed in boiling water for 2 hours, the state of coating was observed.

7, 525 parts of alkyd resin solution obtained in Example 2, 185 parts of xylene and 90 parts of n-butyl alcohol were added. The temperature of contents was raised up to 120° C. with vigorous stirring and flowing nitrogen gas. After the temperature of the contents reached 120° C., a mixture of 115 parts of styrene, 46 parts of ethyl acrylate, 21 parts of 2-hydroxyethyl methacrylate, 6 parts of acrylic acid, and 5 parts of benzoyl peroxide was added dropwise through a dropping funnel over a period of 1.5 hours. 45 minutes after the addition of the mixture of vinyl monomers, half the mixture containing 40 parts of xylene, 10 parts of n-butyl alcohol, 2 parts of benzoyl peroxide put in a dropping funnel beforehand, was added dropwise over a period of 15 minutes, and after an hour another half was added over a period of 15 minutes. Then, the stirring was continued for 4 hours until the reaction was finished.

As the result of this reaction procedure, graft-resin solution of 50% resin content, acid value of resin of 14.5 and viscosity of K (about 2.75 stokes) measured with a Gardner-type bubble viscometer, was obtained. The graft-resin prepared by this reaction procedure was slightly yellow and clear. An excellent resin solution was formed in which alkyld resin component and vinyl resin component were homogeneously compatible. It was found that the resin in Example 2 was completely incompatible with the polymer from vinyl resin components alone in Example 8.

The graft-resin obtained in this example shows good compatibility with other resins. When the resin mixture solution composed of 75 parts of graft resin and 25 parts of amino resin by resin content, was baked at 140° C. for 30 minutes, a coating was obtained with excellent hardness, flexibility, adhesion, solvent resistance, chemical resistance, and weathering resistance. In this case, iso-butanol-modified melamine resin was used as an amino resin. However, when other amino resin was used, excellent properties were also obtained. In Table 2, the results of compatibility test are shown for these resins.

TABLE 2.—COMPARISON OF COMPATIBILITY OF RESINS

Blending ratio: 1:1 based on resin

| Blended resins (as a type of varnish) | | Sample | |
|---|---|---|---|
| | | Resin varnish from Example 2 | Resin varnish from Example 8 |
| Amino resin type | Methylated melamine resin [1] | Slightly compatible | Compatible. |
| | Butylated melamine resin [2] | Incompatible | Do. |
| Alkyd resin type | Alkyd resin—1 [3] | Incompatible | Compatible. |
| | Alkyd resin—2 [4] | do | Do. |
| | Alkyd resin—3 [5] | do | Do. |
| | Alkyd resin—4 [6] | do | Do. |
| Acrylic resin type | Thermosetting acrylic resin—1 [7] | Incompatible | Compatible. |
| | Thermosetting acrylic resin—2 [8] | do | Do. |
| | Thermosetting acrylic resin—3 [9] | do | Do. |
| | Acrylic lacquer [10] | do | Do. |
| Cellulose ester type | Cellosolve acetate butyrate [11] | Incompatible | Compatible. |
| | Nitro cellulose | Slightly compatible | Do. |

[1] Hexabismethoxy methylmelamine.
[2] Butanol-modified melamine resin. Formalin: melamine=4.8:1 (mole ratio).
[3] Composition of resin (mole ratio): ethylene glycol (0.75), pentaerythritol (0.33), phthalic anhydride (1.00), coconut-oil fatty acid (0.30). Oil length: 22%.
[4] Composition of resin (mole ratio): trimethylol propane (1.00), phthalic anhydride (1.00), coconut-oil fatty acid (0.50). Oil length: 30%.
[5] Composition of resin (mole ratio): pentaerythritol (0.22), glycerol (0.78), phthalic anhydride (1.00), coconut-oil fatty acid (0.63). Oil length: 37%.
[6] Composition of resin (mole ratio): pentaerythritol (0.80), ethylene glycol (0.20), phthalic anhydride (1.00), soybean-oil fatty acid (1.30). Oil length: 60%.
[7] Composition of resin (weight percent): styrene (40), ethyl acrylate (45), N-methylol acrylamide (15).
[8] Composition of resin (weight percent): styrene (40), ethyl acrylate (52), 2-hydroxyethyl methacrylate (6), acrylic acid (2).
[9] Composition of resin (weight percent): methyl methacrylate (49), butyl acrylate (36), 2-hydroexythyl methacrylate (12), acrylic acid (3).
[10] Composition of resin (weight percent): styrene (50), ethyl acrylate (30), 2-ethyl hexyl acrylate (20)/nitrocellulose=1/1 (weight ratio).
[11] Mixed solution of ethyl acetate/methyl isobutyl ketone/toluene (18/20/50 weight ratio). Solid content: 25%.

EXAMPLE 9

To the same type of reaction vessel used in Example 7, 667 parts of oil-modified alkyd resin solution obtained in Example 3 and 350 parts of toluene was charged. The temperature of contents was raised to 90° with vigorous stirring and flowing nitrogen gas. When the temperature reached 90° C., a mixture of 240 parts of methyl methacrylate, 210 parts of ethyl acrylate, 120 parts of 2-hydroxyethyl acrylate, 30 parts of acrylic acid and 12 parts of benzoyl peroxide was added dropwise through a dropping funnel over a period of 3 hours. An hour after the addition of mixture of vinyl monomers, one half of a mixture of 50 parts of toluene and 6 parts of benzoyl peroxide put in a dropping funnel beforehand, was added dropwise over a period of 15 minutes. After an hour, another half was added over a period of 15 minutes, and the reaction was further continued with stirring for 4 hours until the reaction was finished. As the result of this reaction procedure a graft-resin solution of 60% resin content and acid value of resin of 26.7 was obtained.

The graft-resin prepared by this procedure was slightly yellow and clear. An excellent resin solution was obtained in which alkyd resin component and vinyl resin component were homogeneously compatible. It was observed that the resin obtained in Example 3 was completely incompatible with the polymer form vinyl resin component alone in this example.

In Table 3 are shown the properties of cured coatings of clear varnishes composed of 80 parts of graft-resin obtained in this example and 20 parts of isobutanol-modified melamine resin by resin content. For comparison, the results of tests for the resin prepared in Example 3 are also indicated in Table 3. The specimen was prepared by coating on one side of a soft steel plate having a thickness of 0.8 mm. and a glass plate having a thickness of 1.5 mm. to the thickness of cured film of 25μ and immediately backing at 160° C. for 20 minutes.

TABLE 3.—COMPARISON OF COATING PROPERTIES

| Item | Sample | |
|---|---|---|
| | Example 3 | Example 9 |
| Scratched value of a film with a pencil. | HB | 2H. |
| Solvent resistance (dipped in xylene at 20° C). | Softened after 5 min. | No change after 2 days. |
| Alkali resistance (dipped in 5% NaOH aq. solution at 20° C). | Deteriorated after a day. | No change after 5 days. |
| Acid resistance (dipped in 5% acetic acid aq. solution at 20° C). | do | Do. |
| Boiling-water resistance (2 hrs.) | Bubbles formed, became cloudy. | Became slightly cloudy. |
| Salt-water spray test[1] (5% NaCl aq. solution, 150 hrs.). | 4 mm | 1 mm. |

[1] Testing method is the same as in Table 1.

Example 10

To the same type of reaction vessel used in Example 7, the oil-modified alkyd resin solution obtained in Example 4 was added. The temperature of contents was raised to 120° C. with vigorous stirring and flowing nitrogen gas, and a mixture of 132 parts of methyl methacrylate, 140 parts of 2-ethylhexyl acrylate, 48 parts of 2-hydroxyethyl methacrylate, 80 parts of acrylic acid and 16 parts of N, N'-azobisisobutyronitrile was added dropwise through a dropping funnel over a period of 2 hours.

During the procedure of this reaction, the temperature of contents was likely to rise to some extent due to the heat of polymerization, so the heat source was controlled for the temperature to be kept at 120° C. An hour after the mixture of vinyl monomers added, a mixture of 16 parts of n-butoxyethanol and 2 parts of N,N'-azobisisobutyronitrile put in a dropping funnel beforehand, was added dropwise over a period of 15 minutes. then, the stirring was continued for 4 hours until the reaction was finished.

As the result of this reaction procedure a viscous graft-resin solution of 75.7% resin content and acid value of resin of 83.0 was obtained. Then the acid groups of this graft-resin solution were neutralized with amine to obtain a water-soluble resin. If alkali was used for neutralization instead of amine, a similar water-soluble resin was obtained. The graft-resin obtained in this procedure was slightly yellow and clear. An excellent resin solution was obtained in which alkyd resin component and vinyl resin component were homogeneously compatible. No compatibility was observed between the resin obtained in example 4 and the polymer from vinyl components alone in Example 10. As for the graft-resin obtained in this example, the resin varnish coating, which contained 80 parts of graft-resin and 20 parts of water-soluble amino resin (for example, hexakismethoxymethylmelamine), was neutralized with amine to be water-soluble and baked at 140° C. for 30 minutes, showed excellent physical properties, solvent resistance, chemical resistance, and weathering resistance. If alkali was used as a neutralizing agent, the similar properties were obtained as in the case of amine. The results of test of physical properties of this coating is shown in Table 4.

tive humidity of 75±3% for an hour, and then this grid test was carried out using the same chamber.

(3) Drawing test (soft steel plate)

Using a drawing test apparatus, a spiral pattern of 1 cm. in diameter reaching the substrate was drawn on a coated surface of the specimen with a sharpened strong needle under a pressure of 1 kg. Adhesive tape was stuck onto it, pressed uniformly with a uniform force, and peeled off rapidly. The peeled-off extent of the coated film was measured.

The specimen was put in a thermo-hygrostated chamber maintained at a temperature of 20±1° C. and a relative humidity of 75±3% for an hour, and then this drawing test was carried out using the same chamber.

(4) Du Pont impact test (soft steel plate)

A specimen of soft steel plate coated on one side was put in a thermo-hygrostated chamber maintained at a tem-

TABLE 4.—COMPARISON OF COATING PROPERTIES OF WATER-SOLUBLE RESIN VARNISHES

Film-drying: Baked at 140° C. for 30 min.
Thickness of dried film: 30±5μ

| | Sample | | |
|---|---|---|---|
| Item | Water-soluble resin varnish in Example 10 | Reference 1, water-soluble alkyd resin varnish [1] | Reference 2, water-soluble acrylic resin varnish [2] |
| Hardness: | | | |
| Scratched value with a pencil | 7H | 3H | 4H. |
| Sward-rocker value | 38 | 28 | 30. |
| Adhesion: | | | |
| Grid test | 100/100 | 100/100 | 90/100. |
| Drawing test (1 kg.) Ericksen test | Good | Peeled off slightly | Peeled off slightly. |
| | More than 8 mm | 5 mm | 4 mm. |
| Impact resistance, Du Pont type impact test (500 g. ½ inch) | 50 cm., passable | 40 cm., passable | 30 cm. passable. |
| Flexibility, mandrel flexural test | 2 mm., passable | 4 mm., passable | 6 mm. passable. |

[1] Composition of resin (mole ratio): phthalic anhydride (0.85) ~ trimellitic anhydride (1,2,4-benzene tricarboxylic acid anhydride) (0.15) ~ trimethylol propane (1.00) ~ cocoanut-oil fatty acid (0.48). Acid value of resin is 50.
[2] Composition of resin (weight percent): styrene (40) ~ ethyl acrylate (18) ~ 2-ethyl hexyl acrylate (20) ~ 2-hydroxyethyl methacrylate (12) ~ acrylic acid (10). Acid value of resin is 80.

In Table 4, the compounding of resin is as follows. 20 parts of hexakismethoxymethylmelamine by resin content is compounded as an amino resin to 80 parts of the resin varnish obtained in Example 10 and the reference varnish by resin content, respectively. Then diethanol amine is added equivalently to the acid values of these resins as a neutralizing agent to neutralize and obtain a water-soluble resin. In order to test the resins prepared, the film coated on a plate was baked at 140° C. for 30 minutes to prepare a specimen. Sward-rocker value and flexibility of coating were measured according to JIS-K-5400, Ericksen test according to JIS-B-7729 and JIS-B-7777. Drawing test was carried out according to Japan National Railways, rolling stock standard SA-211C.

TESTING METHODS (1) Sward-rocker value (soft steel plate)

A sward-rocker test apparatus was used for measurement. After a specimen was left in a thermo-hygrostated chamber maintained at a temperature of 20±1° C. and a relative humidity of 75±3% for an hour, the measurement was carried out in that chamber.

(2) Grid test soft steel plate)

100 of squares reaching to the substrate were cut at intervals of 1 mm. on the surface film coated on a soft iron plate.. Adhesive tape was stuck onto it, pressed uniformly with a uniform force, and peeled off rapidly. The number of remaining squares was counted and expressed as follows.

Evaluation=S/100
S: number of remaining squares
The coated plate was put in a thermo-hydrostated chamber maintained at a temperature of 20±1° C. and a relaperature of 20±1° C. and a relative humidity of 75±3% for an hour, and then the following test was conducted in the same chamber. A bearer and a center of impact of prescribed sizes were fitted to a Du Pont impact test apparatus and a specimen was put between them, turning the coated surface of the specimen upwards. The prescribed weight was dropped on the center of impact from the prescribed height, the specimen was taken out, and after having been left for an hour in the room, the damage of surface was observed. The estimation was expressed by the largest height (cm.) of the weight at which the coated surface was not damaged at all.

(5) Mandrel bending test (tinned plate 0.3 x 50 x 150 mm.)

Test pieces were kept in a thermo-hygrostated chamber at a temperature of 20±1° C. and a relative humidity of 75±3% for 1 hour. Then the tests were conducted in the same chamber. The smallest diameters of the mandrels wherein the coatings did not show any change by 360° bending are indicated.

Example 11

To the same type of reaction vessel used in Example 7, 1,334 parts of oil-modified alkyd resin solution obtained in Example 5 was charged. The temperature of contents was raised to 135° C. with vigorous stirring and flowing nitrogen gas. When the temperature of contents reached 135° C., a mixture of 160 parts of styrene, 40 parts of n-butyl acrylate and 15 parts of di-tert-butyl peroxide was added dropwise through a dropping funnel over a period of an hour. An hour later, the mixture of vinyl monomers was added, one half of a mixture of 50 parts of xylene and 5 parts of di-tert-butyl peroxide put in a dropping funnel beforehand was added dropwise over a period of 15 minutes. After an hour, another half was added dropwise over a period of 15 minutes. After the stirring had been continued for 3 hours, the temperature of contents was lowered to 100° C., and 83 parts of n-butanol was added with vigorous stirring to finish the reaction. As the result of this reaction procedure, a graft-resin solution was obtained with 60% resin content and acid value of resin of 8.0. The graft-resin obtained by this method was slightly yellow and clear. An excellent resin solution was obtained in which alkyd resin component was homogeneously compatible with vinyl resin component. The resin obtained in Example 5 was observed to be completely incompatible with the polymer from vinyl component alone in Example 11.

In Table 5 are shown drying property of clear varnish coating, in which 2.0 parts of lead naphthenate and 0.4 part of cobalt naphthenate were added to 100 parts (by resin content) of graft-resin obtained in this example, and scratched value with a pencil of dried film. For comparison, the results of tests for the resin obtained in Example 5 are given in Table 5.

A specimen was prepared by coating one side of a glass plate with a thickness of 1.5 mm., making the thickness of the dried film to be 25μ. The measurements of drying time and scratched value with a pencil were conducted in a thermohygrostated chamber maintained at a temperature of 20±1° C. and a relative humidity of 75±3%.

of 2 hours. An hour later, 20 parts of the remaining mixed solution were added dropwise over a period of 15 minutes. After an hour, the whole of the remaining mixed solution was added dropwise over a period of 15 minutes. Then, the reaction temperature was maintained in the range of 110° C.–115° C. and the stirring was continued for 4 hours until the reaction was over. By this reaction procedure, a air drying graft-resin with 50% resin content, acid value of resin of 3.5 and viscosity of N (about 3.40 stokes) measured with a Gardner-type bubble viscometer, was obtained. The graft-resin obtained by this method is light brown and clear. It was observed that an excellent resin solution, in which alkyd resin component was homogeneously compatible with vinyl resin component, was produced. It was also observed that the resin obtained in Example 6 was completely incompatible with the polymer from vinyl components alone in Example 12.

Using the graft-resin obtained in this example, a film with excellent adhesion and weathering resistance was obtained by adding 1.83 parts of lead naphthenate and 0.2 part of cobalt naphthenate to 100 parts as resin content. In Table 6 are shown the results of the tests of adhesion and gloss change due to indoor exposure of film for the white enamel using this resin varnish. For comparison, the tests were also conducted for white enamels using the resin varnish obtained in Example 6 and other types of resin varnish. The composition of films in Table 6 are all compounded by 100 parts of resin, 28.6 parts of calcium carbonate, 57.2 parts of titanium oxide, and 14.2 parts of zinc white.

TABLE 6.—COMPARISON OF COATING PROPERTIES

Film-drying: 20±1° C., relative humidity: 75±3%, thickness of dried film: 35μ

| | White enamel using resin varnish of— | | Reference 1, white enamel using styrene-modified alkyd resin [1] | Reference 2, white enamel using acrylated alkyd resin [2] |
|---|---|---|---|---|
| | Example 6 | Example 12 | | |
| Cure time (20° C.): | | | | |
| Set-to-touch | 1 hr | 15 min | 10 min | 10 min. |
| Cured-to-hardness | 5 hrs | 2.5 hrs | 2 hrs | 2 hrs. |
| Adhesion grid test | 10/100 | 100/100 | 20/100 | 20/100. |
| Waterproof adhesion grid test | 0/100 | 100/100 | 10/100 | 10/100. |
| Gloss change due to indoor exposure: | | | | |
| Initial gloss (60°) | 80 | 83 | 83 | 81. |
| 1 month (60°) | 60 | 80 | 73 | 72. |

[1] Composition of resin: a reaction product with styrene of alkyd resin modified with linseed-oil fatty acid and dehydrated castor-oil fatty acid (linseed-oil fatty acid/dehydrated castor-oil fatty acid=75/25 by weight. Oil length 60%) consisting of phthalic anhydride (mole ratio 0.5)—glycerol (mole ratio 0.5). Alkyd resin/styrene=1/1 (by weight).
[2] Composition of resin: a reaction product with methyl methacrylate of alkyd resin modified with soybean-oil fatty acid and dehydrated castor-oil (soybean-oil fatty acid/dehydrated castor-oil fatty acid=50/50 by weight. Oil length 60%) consisting of phthalic anhydride (mole ratio 0.5)—glycerol (mole ratio 0.5). Alkyd resin/methyl methacrylate=1/1 (by weight).

TABLE 5.—COMPARISON OF COATING PROPERTIES

| | Sample | |
|---|---|---|
| Item | Example 5 | Example 11 |
| Cure time [1]: | | |
| Set-to-touch | 15 min | 11 min. |
| Cured-to-hardness | 6 hrs | 2 hrs. |
| Scratched value of cured coating with a pencil [2]: | | |
| 1 day | 6B | 2B. |
| 3 days | B | HB. |

[1] The time at which no adhesiveness is observed by pushing the surface with a finger, is indicated as a set-to-touch time, and that at which no fingerprint is left after pushed strongly the surface with a finger, is called as a cure-to-hardness time.
[2] A plate specimen is put horizontally, and scratched with a sharpened pencil. Expressed by the hardness of the hardest pencil with which the coating is not scratched.

Example 12

To the same type of reaction vessel used in Example 7, 700 parts of oil-modified alkyd resin solution obtained in Example 6, 50 parts of styrene, 70 parts of ethyl acrylate, and 30 parts of butyl acrylate were charged, and the temperature of contents was raised to 110° C. with vigorous stirring and flowing nitrogen gas. After the temperature of contents reached 110° C., 120 parts of a mixture of 120 parts of xylene, 30 parts of n-butyl alcohol, and 12 parts of di-tert-butyl peroxide was added dropwise over a period

TESTING METHODS (1) Drying time (soft steel plate)

The measurement of drying time was carried out in a thermo-hygrostated chamber maintained at a temperature of 20±1° C. and relative humidity of 75±3%. The time at which no adhesiveness was observed by pushing the surface strongly with a finger, was indicated as a set-to-touch time, and that at which no fingerprint was left after being pushed strongly on the surface with a finger, was called as a cured-to-hardness time.

(2) Adhesion in water (Grid test)

A coated plate was immersed in warm water of 40° C., and pulled up after 48 hours. Its coated surface was wiped thoroughly. After having been put in a thermo-hygrostated chamber maintained at a temperature of 20±1° C. and a relative humidity of 75±3% for an hour, the grid test was conducted in the same chamber.

(3) Gloss change due to indoor exposure (soft steel plate)

After a specimen was left in a room sheltered from direct rays of the sun and at a room temperature for the period required, gloss value (reflection percent in an angle of 60°) was measured to obtain the change of gloss.

From the above results the graft-resin obtained by this invention were observed to have very excellent properties. Namely, if the compatibility with other resins, hardness of film, adhesion, impact resistance, flexibility, solvent resistance, chemical resistance, and weathering resistance are considered, it is clearly shown from the examples that the resins obtained in this invention have remarkably excellent properties compared to those of alkyd resin alone or usual vinylated alkyd resin, and it is supported that this invention is epoch-making.

What is claimed is:

1. An organic solvent or water soluble vinyl-graft resin produced by graft-polymerizing vinyl monomers onto alkyd resin prepared from 5 to 60% by weight alicyclic dicarboxylic acid selected from the group consisting of tetrahydrophthalic acid, 4-chloro-4-cyclohexene-1,2-dicarboxylic acid, endo-cis-bicyclo-(2,2,1)-5-heptene-2,3-dicarboxylic acid, 1,4,5,6,7,7-hexachloro-bicyclo-(2,2,1)-5-heptene-2,3-dicarboxylic acid and their acid anhydrides respectively.

2. The graft resin according to claim 1, wherein said vinyl monomer is selected from the group consisting of acrylamide, acrylonitrile, vinyl acetate, styrene, vinyl toluene, 2 - hydroxyethyl methacrylate, 2 - hydroxypropyl methacrylate and a compound represented by the following general formula:

(a) 

where $R_1$ is selected from the group consisting of hydrogen and an alkyl group having from 1 to 8 carbon atoms; and (b) 

where $R_2$ is selected from the group consisting of hydrogen and an alkyl group having from 1 to 12 carbon atoms.

3. The graft resin according to claim 2 wherein said graft polymerization between the vinyl monomer and the alkyd resin is performed between 80° C. and 140° C.

4. The graft resin according to claim 1, wherein said alkyd resin includes vegetable oil fatty acid in an amount from 21 to 65% by weight.

5. The graft resin according to claim 1 dissolved in an organic solvent or water.

6. The graft resin of claim 1 wherein the alicyclic compound is tetrahydrophthalic acid or its anhydride.

7. The graft resin of claim 1 wherein the alicyclic compound is endo-cis-bicyclo-(2,2,1)-5-heptene-2,3-dicarboxylic acid or its anhydride.

8. The graft resin of claim 1 wherein the alicyclic compound is 1,4,5,6,7,7-hexachlorobicyclo-(2,2,1)-5-heptene-2,3-dicarboxylic acid or its anhydride.

9. The graft resin of claim 1 wherein the weight ratio of alkyd resin to vinyl monomer ranges from 1:9 to 9:1.

10. The graft resin of claim 1 wherein said vinyl monomer is grafted onto the alicyclic component of said alkyd resin.

References Cited

UNITED STATES PATENTS

| | | | |
|---|---|---|---|
| 2,475,731 | 7/1949 | Weith | 260—871 |
| 1,779,700 | 1/1957 | Robitshek et al. | 260—869 |
| 2,783,215 | 2/1957 | Robitshek et al. | 260—869 |
| 2,890,144 | 6/1959 | Robitshek et al. | 260—869 |
| 3,004,003 | 10/1961 | Batzer | 260—871 |
| 3,196,191 | 7/1965 | Haigh et al. | 260—869 |
| 3,275,709 | 9/1966 | Wooster et al. | 260—861 |
| 3,294,711 | 12/1966 | Bonin | 260—873 |
| 3,380,942 | 4/1968 | Menke | 260—22 |
| 3,405,087 | 10/1968 | Fryd | 260—861 |

FOREIGN PATENTS

| | | | |
|---|---|---|---|
| 542,845 | 6/1957 | Canada | 260—871 |
| 662,560 | 5/1963 | Canada | 260—22 |
| 1,082,053 | 5/1960 | Germany | 260—869 |

DONALD E. CZAJA, Primary Examiner

R. W. GRIFFIN, Assistant Examiner

U.S. Cl. X.R.

117—124 E, 132 R, 161 K; 260—22 XA, 29.2 E, 33.4 R, 33.6 R, 861, 869, 871, 873